(12) United States Patent
Kim et al.

(10) Patent No.: US 7,622,524 B2
(45) Date of Patent: Nov. 24, 2009

(54) PREPARATION OF ACRYLIC POLYMER SOL FOR COATING

(75) Inventors: Dae-Jin Kim, Yongin (KR);
Hee-Cheong Lee, Yongin (KR);
Guo-Jun Wang, Yongin (KR);
Chung-Seock Kang, Yongin (KR);
Young-Bum Kim, Seoul (KR)

(73) Assignee: Kolon Industries, Inc. (KR)

( * ) Notice: Subject to any disclaimer, the term of this patent is extended or adjusted under 35 U.S.C. 154(b) by 558 days.

(21) Appl. No.: 10/521,375

(22) PCT Filed: Jul. 18, 2003

(86) PCT No.: PCT/KR03/01418

§ 371 (c)(1),
(2), (4) Date: Dec. 1, 2005

(87) PCT Pub. No.: WO2004/009649

PCT Pub. Date: Jan. 29, 2004

(65) Prior Publication Data

US 2006/0106142 A1    May 18, 2006

(30) Foreign Application Priority Data

Jul. 23, 2002   (KR) .................... 10-2002-0043129
Jul. 18, 2003   (KR) .................... 10-2003-0048971

(51) Int. Cl.
*C08L 31/06*    (2006.01)

(52) U.S. Cl. .................... 524/556; 524/558; 524/559; 524/560

(58) Field of Classification Search .................... 524/556
See application file for complete search history.

(56) References Cited

U.S. PATENT DOCUMENTS

| 4,071,653 A | 1/1978 | Boessler et al. |
| 4,199,486 A | 4/1980 | Boessler et al. |
| 4,210,567 A | 7/1980 | Kosters |
| 5,668,209 A | 9/1997 | Ruch et al. |
| 5,928,830 A * | 7/1999 | Cheng et al. ........... 430/137.12 |

FOREIGN PATENT DOCUMENTS

| GB | 1516510 A | * | 7/1978 |
| JP | 56116759 A | * | 9/1981 |
| JP | 06271677 A | * | 9/1994 |
| WO | WO9829507 A1 | * | 7/1998 |

* cited by examiner

*Primary Examiner*—Marc S Zimmer
*Assistant Examiner*—Nicole M Buie
(74) *Attorney, Agent, or Firm*—The Farrell Law Firm, LLP

(57) ABSTRACT

Disclosed are acrylic polymer beads and an acrylic sol composition containing the acrylic polymer beads that are used for automobile underbody floor, wheel housing, fuel tank, body panel junction and hood, door, or the like for the purpose of water tightness, vibration isolation, and anticorrosion. More specifically, the acrylic polymer beads having a core/shell structure, which are prepared by using a part of the monomer constituting a core layer to form seeds by a seed polymerization, polymerizing the rest of the monomer to form a core layer and then foaming a shell layer containing an appropriate amount of a crosslink agent, have a narrow particle size distribution and thereby provide, when used in addition to a plasticizer and a filler in the preparation of an acrylic sol composition for automobile, high storage stability of the acrylic sol and excellent properties of the coating formed by gelation of the acrylic sol.

3 Claims, No Drawings

PREPARATION OF ACRYLIC POLYMER SOL FOR COATING

TECHNICAL FIELD

The present invention relates to acrylic polymer beads having a core/shell structure and a uniform particle size distribution, a preparation method thereof, and an acrylic sol composition containing the acrylic polymer beads. More specifically, the present invention relates to a preparation method for acrylic polymer beads that involves preparing a core/shell type acrylic polymer emulsion having a uniform particle size with a narrow particle diameter distribution in the range of 0.2 to 0.5 μm by an emulsion polymerization method based on seed polymerization, and spray-drying the prepared acrylic polymer emulsion to form acrylic polymer beads having a particle diameter of 10 to 100 μm, and an acrylic sol composition for automobile prepared by mixing the acrylic polymer beads with a plasticizer, a filler, and so forth to provide with high storage stability and excellent properties of a coating formed by gelation of the acrylic sol.

BACKGROUND ART

The one of the five general-purpose resins, polyvinylchloride (PVC) is used for various applications, such as plastics, films, adhesives, etc. and, primarily for plastic sols. The most popular plastic sol for the industrial use purpose is the PVC sol that is prepared by dispersion of PVC powder and fillers in a plasticizer. The PVC sol contains, according to its use purpose, a pigment, a thermal stabilizer, a foaming agent, a diluent, and so forth.

The plastic sol is widely used in various applications, including automobile, carpet, wallpaper, coating, or the like. In particular, the PVC sol is generally applied to automobile underbody floor, wheel housing, or fuel tank for the purpose of water tightness, vibration isolation, and anticorrosion, and automobile body panel junction and hood, door, or the like for the purpose of water tightness and anticorrosion. The PVC sol, however, gives off a hydrogen chloride gas from its principal component, PVC during incineration to cause damage on the incinerator and generation of dioxin as well as acid rain and destruction of the ozone layer. Due to these problems, the restriction on the use of the PVC sol has been consolidated with many attempts made on the substitute of the PVC sol.

Accordingly, Japanese Patent Laid-open Nos. H07-102147, 08-3411 and 08-73601 disclose a method for preparing an acrylic polymer and an acrylic sol containing the acrylic polymer. According to the method, the acrylic polymers for sol have a double-layer or multi-layer core/shell structure that the core layer is comprised of a polymer highly compatible with a plasticizer, the shell layer being comprised of a polymer poor in compatibility with the plasticizer. The acrylic polymer particle of the core/shell structure gets storage stability from the shell layer retarding gelation caused by the plasticizer at the storage temperature, and forms a coating from the polymer of the core layer highly compatible with the plasticizer at the gelation temperature.

But the acrylic polymer beads as disclosed in those documents have a wide particle size distribution in the range of 0.1 to 100 μm and are not suitable to an acrylic sol for automobile requiring high storage stability.

More specifically, when the acrylic polymer obtained after spry drying contains beads having a particle diameter of less than 10 μm, the particles are readily plasticized at the room temperature after the preparation of the acrylic sol to rapidly increase the viscosity of the sol with an elapse of time. The reason why these spray-dried beads have a wide particle size distribution is because the primary particles in the polymerized emulsion state and hence the secondary particles formed after the spray drying have a wide particle size distribution. Moreover, the high water absorption capacity characteristic to the acrylic polymer causes bubbles in the coating formed by gelation and leads to serious problems when coated on the mobile underbody floor, or wheel housing.

To summarize the problems with the prior art, the acrylic polymer beads according to the conventional method for preparing acrylic polymer beads having a core/shell structure have a wide particle diameter distribution and contain particles having a particle diameter of less than 10 μm, thereby hardly providing storage stability of the sol. In addition, the high water absorption capacity of the acrylic polymer particles causes bubbles in the coating formed by gelation of the acrylic sol to deteriorate the properties of the coating.

In an attempt to solve the problems related to the poor storage stability of the acrylic sol and the deteriorated properties of the coating formed by gelation in the preparation of acrylic polymer beads having a core/shell structure, the inventors of the present invention have figured out that a core/shell type acrylic polymer emulsion having a narrow particle diameter distribution of 0.2 to 0.5 μm can be prepared by using a part of the monomer constituting a core layer to form seeds by a seed polymerization, polymerizing the rest of the monomer to form a core layer and then forming a shell layer containing an appropriate amount of a crosslink agent to form acrylic polymer beads having a core/shell structure.

The inventors of the present invention have also figured out that acrylic polymer beads having a particle diameter of 10 to 100 μm can be prepared by spray-drying the core/shell type acrylic polymer emulsion and used for the preparation of an acrylic sol having a high storage stability and excellent properties of the coating formed by gelation.

It is therefore an object of the present invention to provide acrylic polymer beads having a narrow particle size distribution.

It is another object of the present invention to provide a method for preparing acrylic polymer beads having a core/shell structure and a narrow particle size distribution by seed polymerization.

To achieve the objects of the present invention, there is provided acrylic polymer beads for automobile having an average particle diameter of 0.2 to 0.5 μm, a standard deviation of particle diameter of 1 to 12% with respect to the average particle diameter as measured with a Submicron Particle Sizer in an emulsion obtained by emulsion polymerization, and the final average particle diameter of 10 to 100 μm.

In one aspect of the present invention, there is provided a method for preparing acrylic polymer beads for automobile that uses an emulsion polymerization and involves preparing an emulsion containing acrylic polymer beads having a core/shell structure, and spray-drying the emulsion to form acrylic polymer beads. The method includes: (a) adding an ion-exchange water, 5 to 60 wt % of a monomer constituting a core layer, and an emulsifier, heating the resultant mixture, adding an aqueous initiator, and performing polymerization for 1 to 4 hours to form seeds; (b) adding dropwise the rest of the monomer constituting the core layer, and further performing polymerization for 1 to 6 hours to form a core layer; (c) adding a monomer constituting a shell layer, and further performing the polymerization for 2 to 8 hours to form an emulsion containing acrylic polymer beads having a core/shell structure; and (d) spray-drying the emulsion containing the acrylic polymer beads to prepare the acrylic polymer beads.

In another aspect of the present invention, there is provided an acrylic sol composition for automobile that includes 100 parts by weight of the acrylic polymer beads having a core/shell structure as obtained by the above-described method; 50 to 150 parts by weight of a plasticizer; and 50 to 150 parts by weight of a filler.

DISCLOSURE OF INVENTION

The present invention involves preparing acrylic polymer beads by emulsion polymerization to have a core/shell structure. In the polymerization of the core layer, an ion-exchange water, a part of the monomer constituting the core layer, and an emulsifier are mixed, heated to 60 to 90° C., and treated with an aqueous initiator for 1 to 4 polymerization to form seeds. The rest of the monomer for the core layer and the emulsifier are then further added to complete the core layer. Subsequently, a monomer constituting the shell layer is polymerized to obtain an emulsion containing acrylic polymer beads having an average particle diameter of 0.2 to 0.5 μm with a standard deviation of 1 to 12% with respect to the average particle diameter. The emulsion is spray-dried to form beads having an average particle diameter of 10 to 100 μm. But, the present invention is not specifically limited to this core/shell double layer structure.

The acrylic polymer beads obtained by spray-drying the polymerized emulsion in the present invention have a narrow particle diameter distribution of 10 to 100 μm. If the beads have a particle diameter of less than 10 μm, then they are susceptible to gelation by the plasticizer during storage, thereby deteriorating the storage stability. This is a vulnerable point especially for the acrylic sol composition for automobile or the like that requires high storage stability. Otherwise, if the beads have a particle diameter exceeding 100 μm, then the coating formed by gelation of the beads is non-uniform with the outflow of the plasticizer. It is therefore important to control the particle diameter of the beads obtained by spray drying to have a narrow distribution of 10 to 100 μm. For this purpose, the particles of the polymerized emulsion are controlled to have an average particle diameter of 0.2 to 0.5 μm with a standard deviation of 1 to 12% with respect to the average particle diameter.

More specifically, the method for preparing acrylic polymer beads having a core/shell structure according to the present invention includes the first step of adding an ion-exchange water having a resistance of greater than 1 mΩ, 5 to 60 wt. % of a monomer constituting the core layer with an appropriate amount of a crosslink agent, and an emulsifier to a reactor, heating the reactor to an internal temperature of 60 to 90° C., and adding an aqueous initiator for 1 to 4 polymerization to form seeds.

The second step of the method involves adding the rest of the monomer constituting the core layer in an amount of 40 to 95 wt. %, and the emulsifier to the reactor for polymerization to form the core layer.

The third step involves adding a monomer constituting the shell layer with an appropriate amount of the crosslink agent while maintaining the constant internal temperature of the reactor, polymerizing the monomer, and further adding an initiator to complete the polymerization and obtain an emulsion containing acrylic polymer beads having a core/shell structure and an average particle diameter of 0.2 to 0.5 μm with a standard deviation of 1 to 12% with respect to the average particle diameter.

The final step involves spray-drying the polymerized emulsion to prepare beads having an average particle diameter of 10 to 100 μm.

Preferably, the weight ratio (wt %/wt %) of core to shell is 30:70 to 75:25.

In the preparation of the acrylic polymer beads having a core/shell structure, the specific examples of the monomer used for the core layer may include n-butylacrylate, isobutylacrylate, sec-butylacrylate, tert-butylacrylate, butylacrylate, ethylacrylate, styrene, methylmethacrylate, benzylacrylate, or butylacrylate. These monomers can be used alone or in combination of at least two.

The specific examples of the monomer used for the shell layer may include methylmethacrylate, acrylic acid, methacrylic acid, acrylonitrile, or benzylmethacrylate. These monomers can be used alone or in combination of at least two.

In the preferred embodiment of the present invention, a crosslink agent can be further used in addition to the monomers in forming the core and shell layers. The addition of the crosslink agent forms the net structure of polymer chains and prevents the penetration of the plasticizer to enhance the storage stability of the acrylic sol.

The specific examples of the crosslink agent as used herein may include 1,2-ethanedioldi(meth)acrylate, 1,3-propanedioldi(meth)acrylate, 1,4butanedioldi(meth)acrylate, 1,5-hexanedioldi(meth)acrylate, divinylbenzene, ethyleneglycoldi(meth)acrylate, propyleneglycoldi(meth)acrylate, butyleneglycoldi(meth)acrylate, triethyleneglycoldi(meth)acrylate, polyethyleneglycoldi(meth)acrylate, polypropyleneglycoldi(meth)acrylate, polybutyleneglycoldi(meth)acrylate, and allyl(meth)acrylate. These crosslink agents can be used alone or in combination of at least two.

The added amount of the crosslink agent for the core layer is preferably 0.1 to 3 parts by weight based on 100 parts of the monomer for the core layer. If the added amount of the crosslink agent exceeds 3 parts by weight based on 100 parts by weight of the monomer for the core layer, then the coating that must have such a smoothness as rubber becomes hard.

The added amount of the crosslink agent for the shell layer is preferably 0.1 to 5 parts by weight based on 100 parts of the monomer for the shell layer. If the added amount of the crosslink agent exceeds 5 parts by weight based on 100 parts by weight of the monomer for the shell layer, then the final coating is hardened.

The specific examples of the emulsifier as used herein for polymerization of the acrylic polymer beads having a core/shell structure according to the present invention may include anionic emulsifiers, including sodium, ammonium or potassium salts of $C_4$-$C_{30}$ alkylsulfate (e.g., sodium dodecylsulfate, sodium dioctylsulfosuccinate, sodium dodecylbenzenesulfate, etc.), or reactive emulsifiers or amphoteric emulsifiers of the same system. The content of the emulsifier is preferably 0.1 to 4.0 part by weight based on 100 parts by weight of the monomer for each layer.

The ion-exchange water used for polymerization of the acrylic polymer beads having a core/shell structure according to the present invention is a purified water having a resistance of more than 5 MΩ in the nitrogen atmosphere as generated from an ion exchanger. The used amount of the ion-exchange water is preferably 80 to 800 parts by weight based on the total weight of the monomers.

The acrylic polymer beads having a core/shell structure are used to prepare an acrylic sol composition for automobile. More specifically, the acrylic sol composition for automobile may include 100 parts by weight of the acrylic polymer beads, 50 to 150 parts by weight of a plasticizer; and 50 to 150 parts by weight of a filler, and additionally an adhesive agent or a water absorber.

The specific examples of the plasticizer used for the acrylic sol composition of the present invention may include phthalate plasticizers (e.g., dibutylphthalate, dioctylphthalate, diisononylphthalate, diisodecylphthalate, butylbenzylphthalate, etc.); phosphate plasticizers (e.g., tricresylphosphate, tri-2-ethylhexylphosphate, cresyldiphenylphosphate, triarylphosphate, etc.); aliphatic plasticizers (e.g., di-2-ethylhexyladiphate, diisodecyladiphate, etc.); or $C_5$-$C_{200}$ lower paraffins or olefins. These plasticizers can be used alone or in combination of at least two.

The content of the plasticizer is preferably 50 to 150 parts by weight based on 100 parts by weight of the acrylic polymer beads. If the content of the plasticizer is less than 50 parts by weight, then the sol composition cannot be applied by spray coating or the like because of its extremely high viscosity, and the coating formed by gelation of the sol composition has a low impact strength. Otherwise, if the content of the plasticizer exceeds 150 parts by weight, then the sol composition has an extremely low viscosity and runs down before the formation of a coating by gelation, and the plasticizer flows out after gelation.

The specific examples of the filler for the acrylic sol composition may include calcium carbonate, talc, clay, silica, mica, kaolin, titanium dioxide, carbon black, dye, pigment, aluminum hydroxide, bentonite, or aluminum oxide. These fillers can be used alone or in combination of at least two. The content of the filler is preferably 50 to 150 parts by weight based on 100 parts by weight of the acrylic polymer beads. The content of the filler less than 50 parts by weight deteriorates the property-compensating effect of the filler, but the content of the filler exceeding 150 parts by weight leads to an extremely high viscosity and deteriorates the properties of the coating formed by gelation.

When the acrylic sol composition of the present invention is used as a coating on the automobile underbody and applied to the bottom of an automobile, the adhesive agent is used for the adhesion to steel plates. Namely, the addition of the adhesive agent is necessary for the adhesive strength while the automobile is running, in order to maintain the water tightness, vibration isolation, and anticorrosion functions of the acrylic sol applied on the automobile bottom body.

The specific examples of the adhesive agent may include at least one selected from bisphenol-A epoxy, tetrabromobisphenol-A epoxy, urethane-modified epoxy, rubber-modified epoxy, trifunctional epoxy, tetrafunctional epoxy, polyfunctional bisphenol-A epoxy, phenol novolak epoxy, cresol novolak epoxy, and bisphenol-A novolak epoxy. The content of the adhesive agent is preferably less than 10 parts by weight based on 100 parts by weight of the acrylic polymer beads. The content of the adhesive agent exceeding 10 parts by weight deteriorates the storage stability of the sol.

The acrylic sol composition for automobile according to the present invention further includes an organic or inorganic water absorber, because the acrylic polymer beads may absorb a large amount of water during storage and the water may cause bubbles in the final coating of the acrylic sol prepared from the water-containing acrylic polymer particles.

The specific examples of the water absorber may include at least one selected from methyltrimethoxysilane, calcium oxide, calcium chloride, silica gel, or calcium hydroxide. The content of the water absorber is preferably less than 10 parts by weight based on 100 parts by weight of the acrylic polymer bead. The content of the water absorber exceeding 10 parts by weight may lead to a deterioration of the properties of the coating formed by gelation.

In the preparation method of the acryl sol of the present invention, a plasticizer is added to a kneader or mixer, and the acrylic polymer beads, a filler, or, if necessary, an adhesive agent and a water absorber are uniformly dispersed to form the acryl sol of the present invention.

BEST MODE FOR CARRYING OUT THE INVENTION

Hereinafter, the present invention will be described in detail by way of the following examples, which are not intended to limit the scope of the present invention.

EXAMPLE 1

In the first step, 600 g of an ion-exchange water was added to a 3 l-flask and heated to an internal temperature of 70° C. in the nitrogen atmosphere. A mixed solution containing 200 g of butylmethacrylate as a monomer to be polymerized into the core layer and 2 g of sodium dioctylpersulfosuccinate was prepared. Only 30 wt. % of the mixed solution was added to a reactor and stirred at 200 rpm for 15 minutes. Subsequently, the solution was treated with 15 ml of a potassium persulfate solution and stirred for 60 minutes for polymerization to form seeds.

In the second step, after the completion of the polymerization, the rest of the mixed solution was added dropwise to the reactor over 30 minutes and further polymerized for 4 hours to form a core layer.

After adding 7 ml of the potassium persulfate solution and stirring for 30 minutes, in the third step, 10 g of a mixed solution containing 180 g of methylmethacrylate, 20 g of methacrylic acid and 2 g of sodium dioctylpersulfosuccinate was added dropwise to the reactor over 40 minutes, treated with 15 ml of the potassium persulfate solution, and polymerized for 4 hours. Then, the resultant solution was treated with more 7 ml of the potassium persulfate solution and further polymerized for one hour to complete the polymerization.

The acrylic polymer beads contained in the emulsion thus obtained were analyzed in regard to particle diameter and particle diameter distribution with a Submicron Particle Sizer. In addition, the beads in the emulsion state were dried with a spray drier having an inlet temperature of 220° C. and an outlet temperature of 88° C. The size of the dried acrylic polymer beads was then measured with an optical microscope equipped with an image analyzer.

Subsequently, 100 parts by weight of the dried acrylic polymer beads, 80 parts by weight of calcium carbonate as a filler, and 10 parts by weight of an epoxy-based adhesive agent (R-1636-2, supplied by Kukdo Chemical Co., Ltd.) were dispersed in 135 parts by weight of dioctylphthalate used as a plasticizer to form an acrylic sol.

The sol thus obtained was kept in a thermohydrostat (40° C., 95%) for 14 hours and measured in regard to viscosity with a Brookfield Viscometer No. 7 Spindle at 20° C., and 20 rpm.

The sol was applied to a thickness of 2 mm by airless spray and subjected to gelation at 150° C. for 40 minutes to analyze the coating condition.

EXAMPLE 2

The procedures were performed to prepare acrylic polymer beads having a core/shell structure in the same manner as described in Example 1, excepting that 10 wt. % of the monomer for the core layer was polymerized to form seeds in the first step and that 90 wt. % of the monomer for the core layer was used to form the core layer in the second step. The composition of the acrylic sol was the same as presented in Example 1.

EXAMPLE 3

The procedures were performed to prepare acrylic polymer beads having a core/shell structure in the same manner as described in Example 1, excepting that 100 parts by weight of the dried acrylic polymer beads, 80 parts by weight of calcium carbonate as a filler, 10 parts by weight of an epoxy-based adhesive agent, and 7 parts by weight of calcium oxide as a water absorber were dispersed in 135 parts by weight of dioctylphthalate used as a plasticizer to prepare an acrylic sol.

COMPARATIVE EXAMPLE 1

600 g of an ion-exchange water was added to a 3 l-flask and heated to an internal temperature of 70° C. in the nitrogen atmosphere. A mixed solution containing 200 g of butylmethacrylate as a monomer to be polymerized into the core layer and 2 g of sodium dioctylpersulfosuccinate was added to the reactor and stirred at 200 rpm for 15 minutes. Subsequently, the solution was treated with 20 ml of a potassium persulfate solution and stirred for 4 hours for polymerization to form a core layer.

After adding 7 ml of the potassium persulfate solution and stirring for 30 minutes, 10 g of a mixed solution containing 180 g of methylmethacrylate, 20 g of methacrylic acid and 2 g of sodium dioctylpersulfosuccinate was added dropwise to the reactor over 40 minutes, treated with 15 ml of the potassium persulfate solution, and polymerized for 4 hours. Then, the resultant solution was treated with more 7 ml of the potassium persulfate solution and further polymerized for one hour to complete the polymerization. The following procedures were performed in the same manner as described in Example 1 to dry an emulsion containing the acrylic polymer beads.

Subsequently, 100 parts by weight of the dried acrylic polymer beads, 80 parts by weight of calcium carbonate as a filler, and 10 parts by weight of an epoxy-based adhesive agent were dispersed in 135 parts by weight of dioctylphthalate used as a plasticizer to form an acrylic sol.

COMPARATIVE EXAMPLE 2

The procedures were performed to prepare acrylic polymer beads having a core/shell structure in the same manner as described in Example 1, excepting that 3 wt. % of the monomer for the core layer was polymerized to form seeds in the first step and that 97 wt. % of the monomer for the core layer was used to form the core layer in the second step. The drying procedure after the completion of the polymerization and the composition of the acrylic sol were the same as described in Example 1.

The properties of the acrylic polymer beads and the acrylic sols prepared from the acrylic polymer beads according to Examples 1, 2 and 3, and Comparative Examples 1 and 2 are presented in Table 1.

EXAMPLE 4

In the first step, 600 g of an ion-exchange water was added to a 3 l-flask and heated to an internal temperature of 70° C. in the nitrogen atmosphere. A mixed solution containing 200 g of butylmethacrylate as a monomer to be polymerized into the core layer, 2 g of allyl(meta)acrylate, and 2 g of sodium dioctylpersulfosuccinate was prepared. Only 30 wt. % of the mixed solution was added to a reactor and stirred at 200 rpm for 15 minutes. Subsequently, the solution was treated with 15 ml of a potassium persulfate solution and stirred for 60 minutes for polymerization to form seeds.

In the second step, after the completion of the polymerization, the rest of the mixed solution was added dropwise to the reactor over 30 minutes and further polymerized for 4 hours to form a core layer.

After adding 7 ml of the potassium persulfate solution and stirring for 30 minutes, in the third step, 10 g of a mixed solution containing 180 g of methylmethacrylate, 20 g of methacrylic acid, 5 g of allyl(meta)acrylate, and 2 g of sodium dioctylpersulfosuccinate was added dropwise to the reactor over 40 minutes, treated with 15 ml of the potassium persulfate solution, and polymerized for 4 hours. Then, the resultant solution was treated with more 7 ml of the potassium persulfate solution and further polymerized for one hour to complete the polymerization.

The acrylic polymer beads contained in the emulsion thus obtained were analyzed in regard to particle diameter and particle diameter distribution with a submicron particle sizer. In addition, the beads in the emulsion state were dried with a spray drier having an inlet temperature of 220° C. and an outlet temperature of 88° C. The size of the dried acrylic polymer beads was then measured with an optical microscope equipped with an image analyzer.

Subsequently, 100 parts by weight of the dried acrylic polymer beads, 80 parts by weight of calcium carbonate as a filler, and 10 parts by weight of an epoxy-based adhesive agent (R-1636-2, supplied by Kukdo Chemical Co., Ltd.) were dispersed in 135 parts by weight of dioctylphthalate used as a plasticizer to form an acrylic sol.

The sol thus obtained was kept in a thermohydrostat (40° C., 95%) for 14 hours and measured in regard to viscosity with a Brookfield Viscometer No. 7 Spindle at 20° C., and 20 rpm.

TABLE 1

| | | Particle Size (nm) (Standard Deviation, nm) of Acrylic Polymer Bead in Emulsion | Average Particle Diameter (μm) (Standard Deviation, nm) After Spray Drying | Acrylic Sol Viscosity (cps) | | Adhesive Strength (kg/cm$^2$) | Coating Condition |
|---|---|---|---|---|---|---|---|
| | | | | Initial | After 14 days | | |
| A | 1 | 280 (15) | 40 (5) | 48,300 | 59,800 | 8.2 | ⊚ (Bubble) |
| | 2 | 420 (25) | 83 (11) | 60,400 | 72,400 | 7.7 | ○ (Bubble) |
| | 3 | 280 (15) | 40 (5) | 51,800 | 61,900 | 7.3 | ⊚ |
| B | 1 | 185 (32) | 19 (7) | 32,400 | 78,800 | 8.2 | ○ (Bubble) |
| | 2 | 480 (70) | 120 (38) | 74,600 | 116,400 | 6.8 | Δ (Bubble) |

Note)
A: Example
B: Comparative Example

The sol was applied to a thickness of 2 mm by airless spray and subjected to gelation at 150° C. for 40 minutes to analyze the coating condition.

EXAMPLE 5

The procedures were performed to prepare acrylic polymer beads having a core/shell structure in the same manner as described in Example 4, excepting that 10 wt. % of the monomer for the core layer was polymerized to form seeds in the first step and that 90 wt. % of the monomer for the core layer was used to form the core layer in the second step. The composition of the acrylic sol was the same as presented in Example 4.

EXAMPLE 6

The procedures were performed to prepare acrylic polymer beads having a core/shell structure in the same manner as described in Example 4, excepting that 100 parts by weight of the dried acrylic polymer beads, 80 parts by weight of calcium carbonate as a filler, 10 parts by weight of an epoxy-based adhesive agent, and 7 parts by weight of calcium oxide as a water absorber were dispersed in 135 parts by weight of dioctylphthalate used as a plasticizer to prepare an acrylic sol.

treated with more 7 ml of the potassium persulfate solution and further polymerized for one hour to complete the polymerization. The following procedures were performed in the same manner as described in Example 4 to dry an emulsion containing the acrylic polymer beads.

Subsequently, 100 parts by weight of the dried acrylic polymer beads, 80 parts by weight of calcium carbonate as a filler, and 10 parts by weight of an epoxy-based adhesive agent were dispersed in 135 parts by weight of dioctylphthalate used as a plasticizer to form an acrylic sol.

COMPARATIVE EXAMPLE 4

The procedures were performed to prepare acrylic polymer beads having a core/shell structure in the same manner as described in Example 4, excepting that 3 wt. % of the monomer for the core layer was polymerized to form seeds in the first step and that 97 wt. % of the monomer for the core layer was used to form the core layer in the second step. The drying procedure after the completion of the polymerization and the composition of the acrylic sol were the same as described in Example 4.

The properties of the acrylic polymer beads and the acrylic sols prepared from the acrylic polymer beads according to Examples 4, 5 and 6, and Comparative Examples 3 and 4 are presented in Table 2.

TABLE 2

|   |   | Particle Size (nm) (Standard Deviation, nm) of Acrylic Polymer Bead in Emulsion | Average Particle Diameter (μm) (Standard Deviation, nm) After Spray Drying | Acrylic Sol Viscosity (cps) | | Adhesive Strength (kg/cm$^2$) | Coating Condition |
|---|---|---|---|---|---|---|---|
|   |   |   |   | Initial | After 14 days |   |   |
| A | 4 | 280 (15) | 40 (5) | 44,300 | 51,800 | 8.2 | ⊚ (Bubble) |
|   | 5 | 420 (25) | 83 (11) | 56,400 | 64,400 | 7.7 | ○ (Bubble) |
|   | 6 | 280 (15) | 40 (5) | 46,800 | 53,900 | 7.3 | ⊚ |
| B | 3 | 185 (32) | 19 (7) | 33,600 | 68,700 | 8.2 | ○ (Bubble) |
|   | 4 | 480 (70) | 120 (38) | 65,300 | 97,500 | 6.8 | Δ (Bubble) |

Note)
A: Example
B: Comparative Example

COMPARATIVE EXAMPLE 3

600 g of an ion-exchange water was added to a 3 l-flask and heated to an internal temperature of 70° C. in the nitrogen atmosphere. A mixed solution containing 200 g of butylmethacrylate as a monomer to be polymerized into the core layer, 2 g of allyl(meta)acrylate, and 2 g of sodium dioctylpersulfosuccinate was added to the reactor and stirred at 200 rpm for 15 minutes. Subsequently, the solution was treated with 20 ml of a potassium persulfate solution and stirred for 4 hours for polymerization to form a core layer.

After adding 7 ml of the potassium persulfate solution and stirring for 30 minutes, 10 g of a mixed solution containing 180 g of methylmethacrylate, 20 g of methacrylic acid, 2 g of allyl(meta)acrylate, and 2 g of sodium dioctylpersulfosuccinate was added dropwise to the reactor over 40 minutes, treated with 15 ml of the potassium persulfate solution, and polymerized for 4 hours. Then, the resultant solution was

INDUSTRIAL APPLICABILITY

The acrylic polymer beads having a core/shell structure according to the present invention, which are prepared by using a part of the monomer constituting a core layer to form seeds by a seed polymerization, polymerizing the rest of the monomer to form a core layer and then forming a shell layer, have a narrow particle size distribution and thereby provide, when used in addition to a plasticizer and a filler in the preparation of an acrylic sol composition for automobile, high storage stability of the acrylic sol and excellent properties of the coating formed by gelation of the acrylic sol. Particularly, the addition of a crosslink agent can enhance the storage stability of the acrylic sol. Accordingly, the acrylic sol composition thus obtained can be applied, as a substitute for the PVC sol, to the automobile underbody floor, wheel housing, fuel tank, body panel junction and hood, door, or the like for the purpose of water tightness, vibration isolation, and anticorrosion.

While this invention has been described in connection with the embodiments, it is to be understood to those skilled in the art that the invention is not limited to the disclosed embodiments, but, on the contrary, is intended to cover various modifications and equivalent arrangements. Particularly, the number of layers is flexible and the core/shell structure can have a gradient. Accordingly, the technical coverage of the present invention is to be included within the spirit and scope of the appended claims.

What is claimed is:

1. A method for preparing acrylic polymer beads for automobile, which beads have an average particle diameter of 0.2 to 0.5 μm and a standard deviation of particle diameter of 1 to 12% with respect to the average particle diameter as measured with a Submicron Particle Sizer in an emulsion obtained by emulsion polymerization, the final average particle diameter after spray drying being 10 to 100 μm, the method comprising:
   (a) adding an ion-exchange water, 5 to 60 wt.% of a monomer constituting a core layer, and an emulsifier to a reactor, heating the reactor, adding an aqueous initiator, and performing polymerization to form seeds;
   (b) adding dropwise the rest of the monomer constituting the core layer, and further performing polymerization to form a core layer;
   (c) adding a monomer constituting a shell layer, and further performing polymerization to form an emulsion containing acrylic polymer beads having a core/shell structure; and
   (d) spray-drying the emulsion containing acrylic polymer beads to prepare acrylic polymer beads.

2. The method as claimed in claim 1, wherein a crosslink agent is additionally used, the crosslink agent being at least one selected from the group consisting of 1,2-ethanedioldi(meth)acrylate, 1,3-propanedioldi(meth)acrylate, 1,4-butanedioldi(meth)acrylate, 1,5-pentanedioldi(meth)acrylate, 1,6-hexanedioldi(meth)acrylate, divinylbenzene, ethyleneglycoldi(meth)acrylate, propyleneglycoldi(meth)acrylate, butyleneglycoldi(meth)acrylate, triethyleneglycoldi(meth)acrylate, polyethyleneglycoldi(meth)acrylate, polypropyleneglycoldi(meth)acrylate, polybutyleneglycoldi(meth)acrylate, and allyl(meth)acrylate.

3. The method as claimed in claim 1, wherein a crosslink agent is additionally used in an amount of 0.1 to 3 parts by weight based on 100 parts by weight of the monomer constituting the core layer during formation of the core layer, and 0.1 to 5 parts by weight based on 100 parts by weight of the monomer constituting the shell layer during formation of the shell layer.

* * * * *